Figure 1:
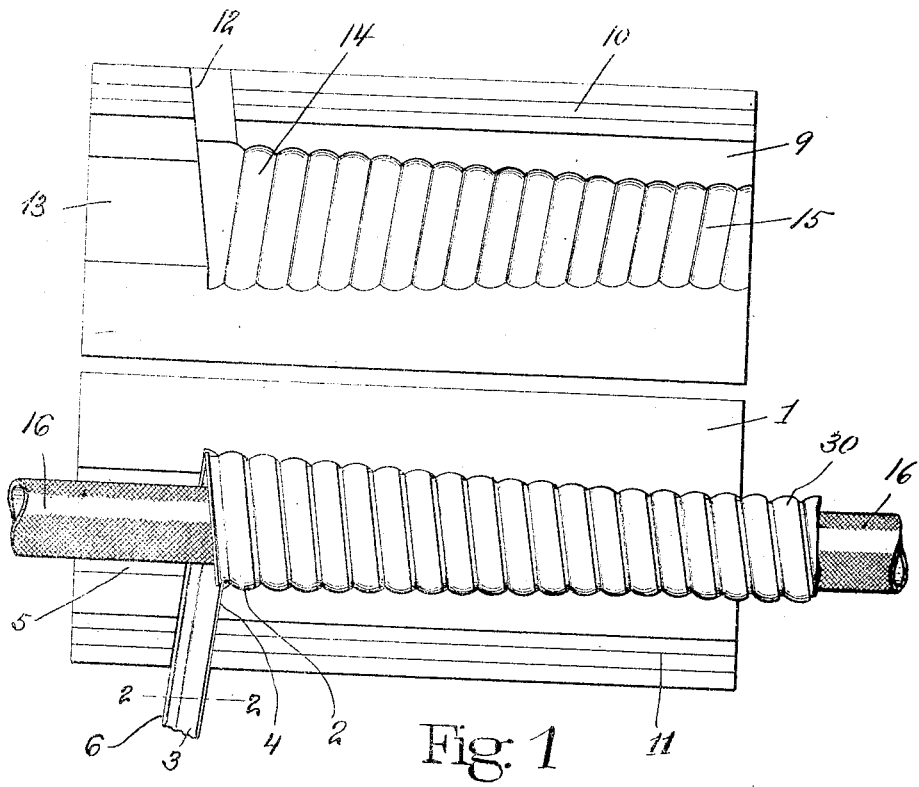

UNITED STATES PATENT OFFICE.

ADNAH McMURTRIE, OF NEW YORK, N. Y., ASSIGNOR TO THOMAS & BETTS COMPANY, OF NEW YORK, N. Y., A CORPORATION OF NEW YORK.

COILING.

1,181,150.  Specification of Letters Patent.  Patented May 2, 1916.

Application filed October 1, 1910. Serial No. 554,926.

*To all whom it may concern:*

Be it known that I, ADNAH McMURTRIE, of New York, N. Y., have invented certain Improvements in Coiling, of which the following description, in connection with the accompanying drawings, is a specification, like references on the drawings designating like parts.

This invention relates to coiling, and is of particular utility when employed in apparatus for manufacture of the helically coiled metal strip used as a protective armor sheath for such articles as hose pipes and insulated electrical conductors, although I contemplate the use of my improvements in any field to which they are adapted by their nature.

An important object of my invention is to provide a method of producing a more gradual helical deformation of the somewhat resilient metal strip of which such sheaths are usually formed, than has been customary in coiling such articles heretofore, and accordingly I contemplate the treatment of the strip by forming the convolutions primarily of greater diameter than that of the finished tube, and thereafter reducing gradually but steadily, without undue prolongation of the treatment, the diameter of the convolutions to the desired size.

Another important object of my invention is to accomplish in a unitary operation with the above helical shaping of the tube, the lateral deformation of the strip along the axis of the helix, which is ordinarily accomplished by treatment of the strip in a separate machine preliminary to the coiling operation, in order to impart to the strip the lateral curvature which has usually constituted the preparation of the strip for its helical formation.

Armor strips at the present time are of substantial width and thickness, owing to the requirements of the fire underwriters, and the exigencies of modern building, which make it necessary that the armor shall so far as possible, be capable of resisting puncture by nails and other destructive agencies, and such substantial armor strip is difficult to deform laterally, especially when the strip is of a more or less acutely bent cross section, for purposes of causing interlocking of the convolutions in their helical form, these difficulties militating strongly against a ready reduction of the strip to spiral form and desired diameter during the formation of the first convolution, as has been the practice heretofore in the manufacture of such armor sheaths. Accordingly, my improved method of deforming a strip helically to form a tube comprises the progressive introduction of said strip to a die having a surface constructed and arranged to form said strip into successively narrowing convolutions finally approximating the desired diameter, said die preferably having a groove with walls constructed to develop said strip continuously into helical convolutions of relatively large initial diameter respectively, said die having surfaces acting successively upon said convolutions to effect a reduction in diameter extending over a plurality of said convolutions and serving to deliver a helix of uniform diameter, smaller than said initial convolution.

Another important object of my invention is to utilize my improved method in the application to an insulated conductor of a strip in a helix narrowing progressively from an early convolution to a later convolution, the completed helix having a substantially uniform inner diameter approximating the exterior diameter of said article.

The apparatus for carrying my improved method into effect will be made the subject of a separate application.

The various features of my invention will be illustrated and described fully in the accompanying drawings and specification, and pointed out in the claim.

Figure 2:

In the drawings Figure 1 is a plan view, showing a die by which my improved method may be carried into effect, and in the construction of which my invention has been embodied; and Fig. 2 is a view in cross section of one form of strip in the treatment of which my improved method and apparatus may be used to advantage, this being the strip shown in Fig. 1, but on a larger scale than in Fig. 1.

In the embodiment of my invention selected for illustration and description to enable ready and complete understanding of the preferred manner in which my invention may be carried into effect, the part designated by the reference numeral 1 is a die having a forming-surface 2 which in accordance with my invention is larger at one region than another, and preferably takes the form of a tapered groove with transverse corrugations in helical form, so that upon introduction thereto of a strip 3 of suitable cross section, as for example that illustrated in Fig. 2, the strip being forced continuously by suitable means (not shown, of any character well known to those skilled in the art), through a gateway 4, the strip will be deformed helically into an initial convolution corresponding in diameter with the larger diameter of the groove 2, and as the feeding of the strip is continued, this initial convolution will be rotated and advanced out of the larger corrugation of the forming groove 2 into succeeding corrugations of the groove, its place in the initial corrugation being taken by a newly formed convolution, and as the convolutions successively progress into narrower corrugations, they will be compressed and reduced in diameter, in accordance with my invention.

In the instance illustrated, the flexible metallic conduit 30, thus formed, is of a uniform interior diameter approximating the exterior diameter of the hose-pipe for which the conduit constitutes a sheath, and the strip may conveniently be formed in place surrounding the insulated conductor, and to facilitate such formation I have shown an extension 5 of the groove 2, this extension being of suitable contour to admit the hosepipe and wide enough to receive at the region adjacent to groove 2 the upturned ridge or portion 6 of the strip 3.

The die may be divided, for the sake of convenience in manufacture, and to permit ready access to the forming-surface, as for example, by horizontal division, when the upper part may take substantially the form illustrated in Figs. 1 at 9, suitable means being provided preferably to insure proper registration of the parts, for which purpose I have shown a ridge 10 on the upper part to enter a groove 11 on the lower part, the upper part having also a gate-piece 12 to enter the gate-way 4 and insure proper feeding of the strip 3 to the periphery of the groove 2. The reference numerals 13 and 14 indicate portions of a forming-surface on the upper die constituting the complementary portions of the groove parts 5 and 2 upon the lower part of the die. 15 indicating the region of discharge of the completed helix.

In operation, the part 9 is closed down upon the part 1, and the strip 3, forced in through the gate-way 4, enters the groove 2, in which it is coiled readily, owing to the relatively large diameter of the groove at this region, so that both the circular and lateral bending strains are accomplished more readily than in apparatus employing the existing method, by which the strip is reduced at once, in its initial convolution, to the desired diameter of the helix.

I do not claim specifically herein certain features which are made the subject matter of the claims in my co-pending applications Serial Nos. 584,923; 584,924; 584,925 and 584,927, filed on the same date as my present application.

Having illustrated and described my invention thus fully, and suitable means for carrying the same into effect, I wish it understood that I do not limit myself to the specific method and materials shown and described by way of example, nor in general do I limit myself otherwise than as set forth in the claim read in connection with this specification.

What I claim as new, and desire to secure by United States Letters Patent, is:—

The improved method of deforming a strip helically to form a tube having overlapping convolutions; said method comprising the consecutive formation of said strip into a continuous series of overlapping convolutions, and the concurrent treatment of several overlapping convolutions continuously at successively contiguous portions of their periphery to reduce each convolution a plurality of times under positive compressive action at each such portion, holding said convolutions respectively against lateral displacement, to form said strip into successively narrowing overlapping convolutions finally approximating the desired diameter.

Signed at New York in the county and State of New York this 26th day of September, 1910.

ADNAH McMURTRIE.

Witnesses:
Wm. H. McCormick,
Alexander C. Proudfit.